United States Patent [19]

Olsen et al.

[11] 3,724,730
[45] Apr. 3, 1973

[54] CAR TOP LUGGAGE CARRIER

[75] Inventors: Harry C. Olsen, Farmington; Ludwig J. Tischler, Huntington Woods; Heinz C. Wernecke, Southfield, all of Mich.

[73] Assignee: F. L. Jacobs Co., Southfield, Mich.

[22] Filed: June 23, 1971

[21] Appl. No.: 155,734

[52] U.S. Cl. .............................................224/42.1 D
[51] Int. Cl. ...............................................B60n 9/00
[58] Field of Search ........224/42.1 D, 42.1 E, 42.1 F, 224/42.1 G, 42.1 H, 42.1 R, 29 R

[56] References Cited

UNITED STATES PATENTS 3,223,301  12/1965  Helm ..............................224/42.1 D Primary Examiner—Gerald M. Forlenza
Assistant Examiner—Jerold M. Forsberg
Attorney—L. Gaylord Hulbert et al.

[57] ABSTRACT

The vehicle top carrier comprises two pairs of rail support assemblies which are mounted at the corners of an imaginary rectangle on the roof of the vehicle. Each support assembly comprises a hollow post including a top wall having an opening therein. A generally hollow closure element or rail fitting is mounted on the post and is provided with a stem which extends into the opening in the top wall. The closure element is provided with one or more openings each defining a collar. Each collar of a support assembly is spaced from and is located opposite a collar of an adjacent support assembly. A resilient adapter base engages the bottom surface of the post and is adapted to engage and to conform to the shape of the roof of the vehicle. Fastening means extend through the hollow closure element, post and adapter base and is secured in the roof of the vehicle. Rails extend between adjacent rail support assemblies, with the rails having opposite ends received in the collars of the closure elements. The rails and support assemblies may be arranged in a "U" shape or in a rectangular configuration on the roof of the vehicle.

13 Claims, 8 Drawing Figures

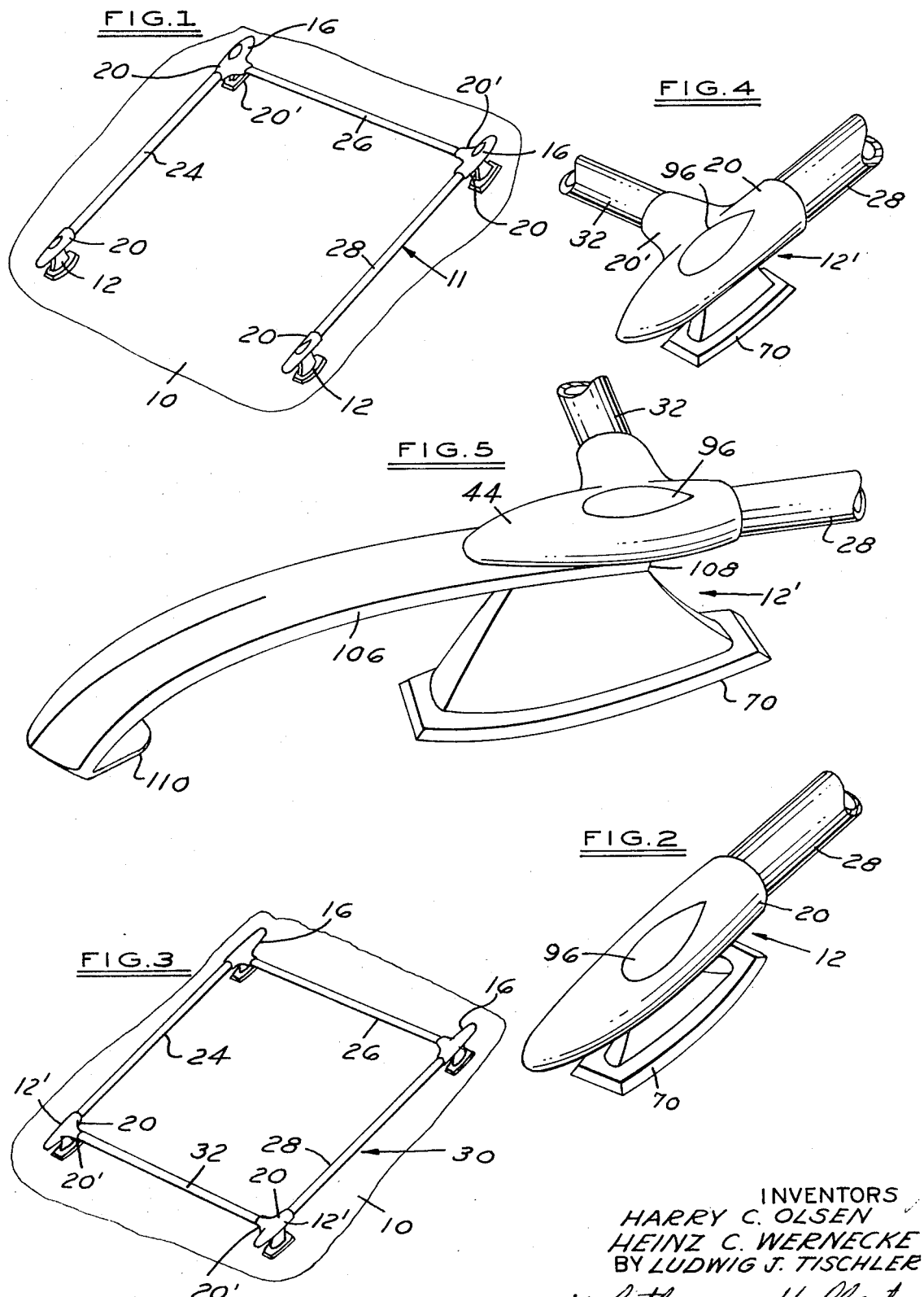

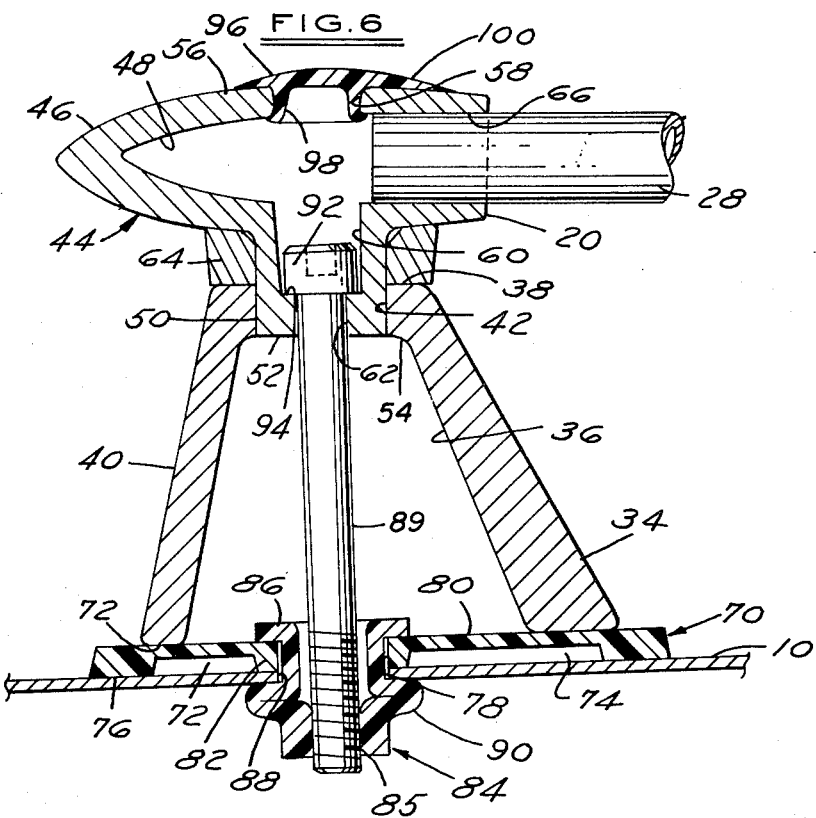
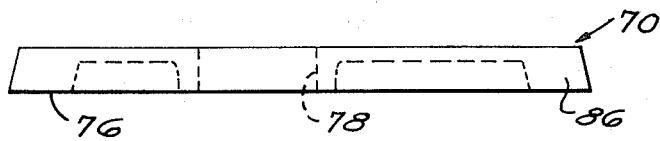
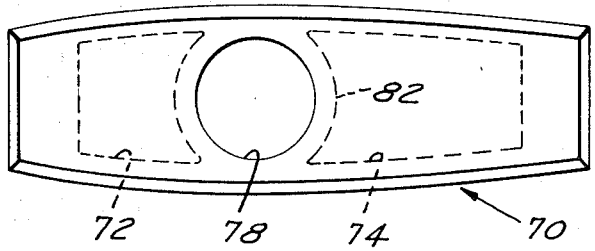

CAR TOP LUGGAGE CARRIER

BACKGROUND OF THE INVENTION

The vehicle top carrier is constructed to fit vehicle roofs of various shapes and sizes and is designed to carry luggage or other items required to be transported. In the past it has been necessary to utilize a different rail support assembly for various makes of automobiles. With the present invention, a standardized rail support assembly is provided which requires the use of a different resilient adapter base for various shaped roofs. The component parts of the rail support assembly are standardized with the exception of the resilient adapter base.

SUMMARY OF THE INVENTION

The improved rail support assembly is of a very simple and inexpensive construction and is one which includes components which may be utilized for different makes of automobiles with the exception of the resilient adapter base that may vary from automobile to automobile depending on the shape of the roof. The vehicle top carrier comprises two pairs of corner rail support assemblies mounted on the roof of the vehicle, with each assembly comprising a hollow post including side walls and a top wall having an opening therein. A hollow closure element or rail fitting is mounted on the post and is provided with a downwardly extending stem which extends into the opening provided in the top wall of the post. Each closure element is provided with one or more openings each defining a collar. Each collar of one support assembly is spaced from and faces a collar of an adjacent assembly. A resilient adapter base made, as an example, from a plastic material, engages the bottom of the post on the upper surface thereof and the lower surface of the adapter base engages and conforms to the roof of the vehicle. Fastening means extend through aligned openings provided in the top and bottom wall surfaces of the closure element, post and adapter base in order to secure each rail support assembly to the vehicle roof. Rails extend between adjacent support assemblies having their ends received in the collars of the closure elements to complete the vehicle top carrier.

In one embodiment of the present invention, one pair of the corner support assemblies each has two collars, spaced 90° apart, and the other pair of corner rail support assemblies are each provided with one collar. With such a construction the rails and corner support assemblies are arranged in a "U" shaped configuration on the roof of the vehicle.

In another embodiment of the present invention, the corner rail support assemblies are each provided with two collars spaced 90° apart, with the rails and corner support assemblies being arranged in a rectangular configuration on the roof of the vehicle.

The standardized rail support assembly is assembled in a novel manner. An opening is provided in the top of the closure element which is aligned in an opening provided in the stem. An elongated threaded fastening element extends through the aligned openings in the top and stem of the closure element and through the interior of the post and through an opening provided in the adapter base for attachment to a nut which is interposed between the adapter base and roof. A resilient plug is inserted into the opening in the top of the closure element for closing same and includes an annular lip which seals the opening.

BRIEF DESCRIPTION OF THE DRAWINGS

FIG. 1 is a perspective view of a generally "U" shaped vehicle top carrier;

FIG. 2 is a perspective view of one corner support assembly utilized in the vehicle top carrier illustrated in FIG. 1;

FIG. 3 is a perspective view of a modified vehicle top carrier arranged in a generally rectangular configuration on the roof of the vehicle;

FIG. 4 is a perspective view of one corner support assembly utilized in the vehicle top carrier illustrated in FIGS. 1 and 3;

FIG. 5 is a fragmentary perspective view of one corner support assembly adapted to be utilized in the vehicle top carrier illustrated in FIG. 3 and including a decorative trim bar or element;

FIG. 6 is a vertical sectional view through a corner support assembly;

FIG. 7 is an elevational view of the resilient adapter base; and

FIG. 8 is a plan view of the resilient adapter base.

Referring now to FIG. 1, the roof of the vehicle is designated by the numeral 10. Mounted on the roof 10 is a vehicle top carrier 11 which includes two identical corner support assemblies 12 forming one pair of corner support assemblies and a second pair of corner support assemblies 16. Each corner support assembly 12 includes one collar 20, while each corner support assembly 16 includes two collars designated by the numerals 20 and 20'. Support assemblies 12 are mounted on the vehicle roof 10 with the collars 20 facing the collars 20 on the support assemblies 16. With such a construction, the collars 20' face one another. Tubular rail elements 24, 26 and 28 are provided between the adjacent rail support assemblies 12 and 16 as best illustrated in FIG. 1.

The vehicle top carrier 30 illustrated in FIG. 3 is similar in construction to the vehicle top carrier 11 illustrated in FIG. 1 with the exception that the rail support assemblies 12' are each provided with two collars 20 and 20' rather than one collar as in support assembly 12. With such a construction an additional rail 32 is provided between the adjacent rail support assemblies 12' and 14' as best illustrated in FIG. 3; otherwise the vehicle top carrier 30 is identical to vehicle top carrier 11.

The rail support assembly 12, 12' and 16 is best illustrated in FIG. 6 and comprises an upstanding post 34 made from a suitable metal or alloy thereof having a hollow interior 36 and including a top wall 38 and generally inclined or downwardly tapering side walls 40 to provide an ornamental and attractive appearance. The top wall 38 is provided with an opening 42.

A closure element or rail fitting 44 is provided having a nose or cone shape portion 46 and a generally hollow interior 48. The closure element 44 may be made from a suitable metal or from a suitable metal alloy. The closure element 44 further includes a downwardly extending stem 50 which is provided with a centrally located cavity 60 and an opening 62, said stem 50 being adapted to be received in the opening 42 in the top wall of the post. The bottom surface 52 of the stem 50 coincides with the inner surface 54 of the top wall 38. The upper wall 56 of the closure element 44 is provided with an opening 58 which is in communication with the hollow interior 48 and the cavity 60 and opening 62 provided in the stem 50 as best illustrated in FIG. 6. A resilient spacer or washer 64 is interposed between the bottom of the closure element 44 and the top wall 38 of the post 34 and surrounds a portion of the stem 50.

Each corner or rail support assembly 12, 12' and 16 is provided with one or more openings 66, each opening defining a collar 20, 20' for receiving one end of a rail as described previously.

A resilient generally elongated adapter base 70 is interposed between the bottom surface 72 of the post 34 and the roof 10 of the vehicle, with the resilient adapter base 70 being adapted to conform to the shape of the vehicle roof 10. The adapter base 70 is provided with longitudinally spaced recesses 72 and 74 in the bottom surface 76 on opposite sides of an opening 78 which extends between the top surface 80 and bottom surface 76. The opening 78 is aligned with the openings 62 and 58 provided in the closure element 44 and is in communication with the interior of post 34. The annular portion 82 of the adapter base 70 surrounding the opening 78 forms a resilient bushing 82 for a nut or rivet 84. The outer peripheral rim portion 86 of the base 70 forms a sealing element which engages the roof 10.

The nut or rivet 84 is a conventional one-piece blind rivet or fastener provided with internal threads 85 and is sold by The B. F. Goodrich Company under the Trademark "Rivnuts." The rivet 84 is originally of cylindrical configuration having an annular flange 86 on the upper end thereof. In assembly, the nut 84 is inserted into the opening 78 provided in the adapter base 70 and extends through opening 88 provided in roof 10, with the flange 86 resting on top surface 80 of the adapter base 70.

Thereafter an elongated standard socket head cap screw 89, threaded on one end, is inserted through the opening 58, cavity 60 and opening 62 in the closure element 44 and then through the interior of the post 34 and is finally brought into threaded engagement with the nut 84. As a result of the threading action between cap screw 89 and nut 84 and intermediate U-shaped portion 90 of nut 84 is urged laterally outwardly to engage the inner surface of roof 10 as shown in FIG. 6 to fixedly secure nut 84 between the adapter base 70 and roof 10.

Once the head 92 on cap screw 89 abuts shoulder 94 on stem 50 the fastening means is secured with the closure element 44, post 34 and adapter base 70 held firmly together on roof 10. Thereafter a plastic plug 96 having a rim portion 98 is inserted into the opening 58 in closure element 44 to close same. The annular lip 100 provided on plug 96 engages the top surface of wall 56 and forms a fluid tight seal around opening 58.

FIG. 5 illustrates a further modification of the present invention. In some applications it may be desirable to provide additional styling for appearance purposes. In such case an elongated trim bar 106 is utilized. The washer or spacer 64 illustrated in FIG. 6 is not utilized when trim bar 106 is utilized. The trim bar 106 has an opening, not shown, on one end 108 through which the stem 50 of closure element 44 extends. End 108 of trim bar 106 may be provided with an integral bushing or washer, not shown, somewhat like washer 64.

Trim bar 106 extends forwardly away from the rail support assembly in alignment with tubular rail 28. As the trim bar 106 extends forwardly it also slopes or tapers in a generally arcuate path toward the roof of the vehicle as best illustrated in FIG. 5. The forward end of trim bar 106 is provided with a reversely turned flange 110 which engages the roof of the vehicle in general friction contact therewith. However, separate fastening means may be provided if required to connect trim flange 110 to the roof of the vehicle. It should be appreciated that any number of decorative trim bars 106 or like elements may be employed with a vehicle top carrier of the present invention.

The rails 24, 26, 28 and 32 are made from metal and are of standard tubular welded construction. The rails have an O.D. of ⅝ inch. The ends of the rails are press fitted into the adjacent collars of the rail assemblies.

What I claim as my invention is:

1. A rail support assembly for attachment to the roof of a vehicle comprising a generally hollow post including side walls and a top wall having an opening therein, a generally hollow closure element mounted on said post having a stem extending into said opening, said closure element having one or more openings each defining a collar adapted to receive a rail, an adapter base engaging the bottom of said post and adapted to engage the roof of the vehicle, and fastening means carried by said hollow closure element and extending through said post and said adapter base to secure the rail support assembly to the roof of the vehicle.

2. A rail support assembly for attachment to the roof of a vehicle comprising a generally hollow post including side walls and a top wall having an opening therein, a generally hollow closure element mounted on said post having a stem extending into said opening, said closure element having one or more openings each defining a collar adapted to receive a rail, a resilient adapter base engaging the bottom of said post and adapted to engage the roof of the vehicle, and fastening means adapted to secure the rail support assembly to the roof of the vehicle, said fastening means extending through said closure element, post, and adapter base for attachment to the roof of the vehicle.

3. A rail support assembly for attachment to the roof of a vehicle comprising a generally hollow post including side walls and a top wall having an opening therein, a generally hollow closure element mounted on said post having a stem extending into said opening, said closure element having one or more openings each defining a collar adapted to receive a rail, a resilient adapter base engaging the bottom of said post and adapted to engage the roof of the vehicle, an opening provided in said stem and a further opening provided in said base aligned with the opening in said stem, and an elongated fastening element carried by said closure element extending through the opening in said stem and the interior of said post and through the opening in said base for attachment to a nut which is adapted to engage the roof of the vehicle.

4. The rail support assembly of claim 2 wherein said adapter base is made from plastic material, with the lower surface thereof adapted to provide an annular fluid-tight seal with the roof of the vehicle.

5. The rail support assembly of claim 2 wherein a spacer is provided between the bottom of said closure element and the top wall of said post, said spacer surrounding said stem.

6. A rail support assembly for attachment to the roof of a vehicle comprising a generally hollow post including side walls and a top wall having an opening therein, a generally hollow closure element mounted on said post having a stem extending into said opening, said closure element having one or more openings each defining a collar adapted to receive a rail, a resilient adapter base engaging the bottom of said post and adapted to engage the roof of the vehicle, fastening means adapted to secure the rail support assembly to the roof of the the vehicle, an elongated trim bar provided with an opening on one end thereof, said end being interposed between the bottom of said closure element and the top wall of said post, said stem extending through the opening in said one end of the trim bar, the other end of said trim bar having a flange adapted to engage the roof of the vehicle.

7. The rail support assembly of claim 3 wherein a further opening is provided in the top of said closure element aligned with the opening in said stem for the insertion of said elongated fastening element and a plug extending into the opening in the top of said closure element for closing same, said plug including a resilient annular lip engaging the top of said closure element for providing a seal around the adjacent opening.

8. The rail support element of claim 2 wherein said closure element is provided with one collar which is adapted to receive an end of a rail.

9. The rail support assembly defined in claim 2 wherein said closure element is provided with two collars, spaced 90° apart, each collar being adapted to receive an end of a rail.

10. The rail support assembly of claim 3 wherein said nut is threaded, and the threading of said fastening element into said nut is adapted to expand an intermediate part of same to provide a flange which engages the under side of the roof of the vehicle.

11. A vehicle top carrier comprising two pairs of corner rail support assemblies mounted on the roof of the vehicle, each assembly comprising a generally hollow post including side walls and a top wall having an opening therein, a generally hollow closure element mounted on said post having a stem extending into said opening, each closure element having one or more openings each defining a collar, each collar of one support assembly facing a collar of an adjacent assembly, an adapter base engaging the bottom of the post and adapted to engage the roof of the vehicle, fastening means adapted to secure each assembly to the roof of the vehicle, the fastening means for each support assembly extending through the corresponding closure element, post and adapter base for attachment to the roof of the vehicle, and rails extending between adjacent rail support assemblies having their ends received in the collars of the support assemblies.

12. The vehicle top carrier of claim 11 wherein one pair of said corner rail support assemblies have two collars, spaced 90° apart, and the other pair of corner rail support assemblies each having one collar, with each of the collars receiving an end of a rail, said rails and corner rail support assemblies being arranged in "U" shape configuration on the roof of the vehicle.

13. The vehicle top carrier of claim 11 wherein said corner rail support assemblies each have two collars, space 90° apart, said rails and corner rail support assemblies being arranged in a rectangular configuration on the roof of the vehicle.

* * * * *